Sept. 9, 1947.  A. GORDON ET AL  2,427,095
ICE CREAM DISHER
Filed July 29, 1946
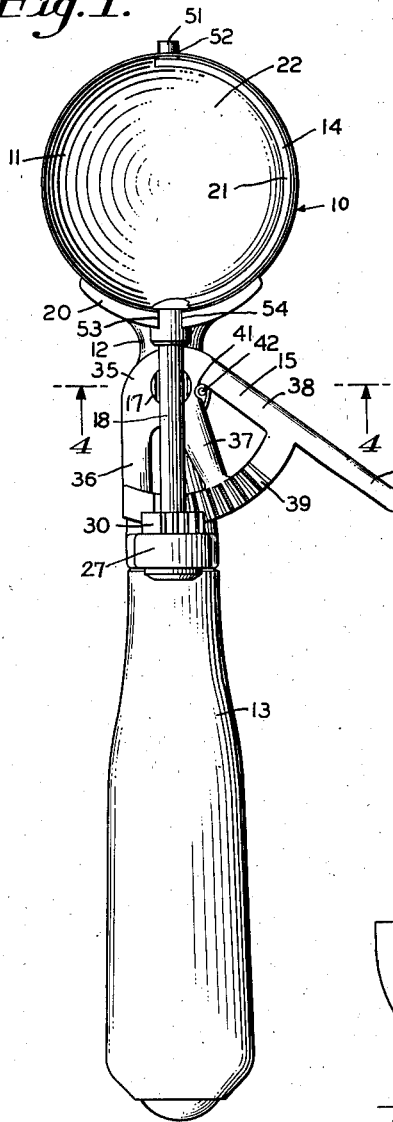
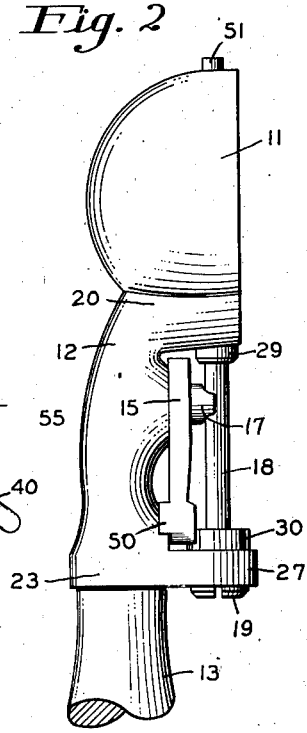
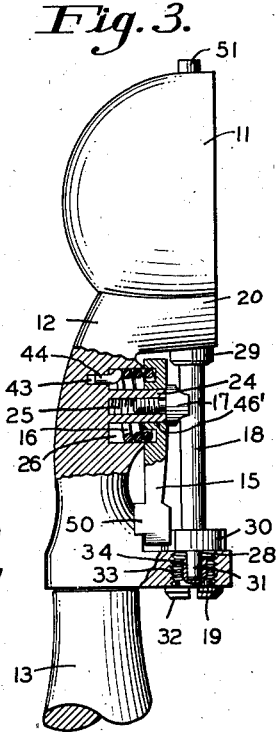
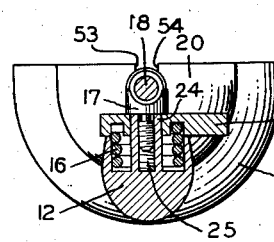
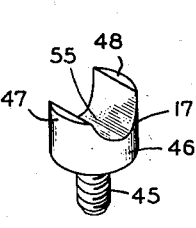
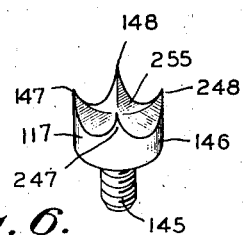
ANTHONY GORDON
STEFAN GEORGE MOZOLEWSKI
INVENTORS
BY Richard S. Temko
ATTORNEY Patented Sept. 9, 1947

2,427,095

UNITED STATES PATENT OFFICE 2,427,095

ICE CREAM DISHER

Anthony Gordon and Stefan George Mozolewski,
New York, N. Y.

Application July 29, 1946, Serial No. 686,928

5 Claims. (Cl. 107—48)

This invention relates generally to ice cream dishers and more particularly to an improved construction thereof.

Ice cream dishers as known, frequently are of a construction having a scoop element and a knife or scraper element coacting therewith. The scraping element is caused to move within the scoop element by actuating means therefor in which a handle, manually operated, is urged to its starting position by a spring. For the replacement of this spring and other purposes, it is desirable that the device be capable of dismantling and reassembly in a convenient manner.

It is among the objects of the present invention to provide structure of the class described wherein the ice cream disher may be quickly and conveniently dismantled and reassembled for the purpose of replacing the main spring thereof, or for cleaning the same.

Another object herein lies in the provision of structure of the class described in which although the parts are easily disassembled when this is desired, yet their accidental disassembly is prevented.

One of the disadvantages of prior known ice cream dishers lies in the danger of small parts accidentally becoming disconnected from the device itself and falling into the food material being dished. As is well known in the art, such dishers are used to serve not only ice cream, ices and sherbets, but also other foods such as vegetables, hard sauce, mashed potatoes and the like.

Another object herein lies in a provision of a device of the class described which may have a long useful life and which is relatively foolproof and trouble-free in operation.

Another object herein lies in the provision of first and second locking elements which prevent undesired displacement of the actuating element in the rack rimmed sector utilized in rotating the knife or scraper element.

These objects and other incidental ends and advantages will more fully appear in the progress of this disclosure and be pointed out in the appended claims.

In the drawings in which similar reference characters designate corresponding parts throughout the several views:

Figure 1 is a face or front elevational view of a disher showing a first embodiment of the invention.

Figure 2 is a fragmentary left side elevational view of Figure 1.

Figure 3 is a fragmentary elevational view corresponding to Figure 2 with parts thereof shown in section.

Figure 4 is a fragmentary sectional view as seen from the plane 4—4 on Figure 1.

Figure 5 is an enlarged view in perspective of the pivot and first locking member of the first embodiment.

Figure 6 is a view in perspective corresponding to Figure 5 but showing a second form of the pivot and first locking element.

In accordance with the invention the disher 10 includes broadly, a scoop element 11, a body 12, a handle 13, a knife or scraper element 14, an actuating element 15, a resilient element 16, a first locking member 17, a second locking member 18 and a third locking member 19.

The scoop element 11 is generally hemispherical in shape and is secured in any suitable manner as by soldering to the support portion 20 of the body 12. The knife or scraper member 21 coacts with the inner surface 22 to dislodge the material contained within the scoop in a well-known manner. The handle 13 is integrated with the bottom portion 23 of the body 12. Between the portions 20 and 23 the body 12 is provided with a forwardly projecting boss 24 having an internally threaded bore 25 and is surrounded by a circular groove or trough 26. In the bottom of the groove 26, that is to say, in the rear vertical wall thereof, a depression 43 is provided. The lower portion 23 has a forwardly extending stationary arm 27 provided with a vertically arranged threaded orifice 28.

The scraper element 14 includes the scraper member 21, the upper bearing 29, the axle or second locking member 18, a pinion 30 and an axle pin or trunnion 31.

The third locking member is in the form of a short screw having transversely slotted head 32, and a threaded shank 33 having a cavity 34.

The actuating element 15 is of irregular shape, best seen in Figures 1 to 4 inclusive of the drawing and includes a hub 35, radial arms 36, 37 and 38, an arcuate rack 39, and an operating handle 40. The hub is provided with an indentation 41 which serves as a seat for the forward end 42 of the coil spring or resilient element 16. The rear terminal 44 of the spring 16 is arranged within the depression 43.

The first locking member 17, best seen in Figure 5, includes a threaded shank 45, a head 46 and a plurality of locking projections 47 and 48.

In the assembled condition thereof, the actuating element 15 is mounted upon the boss 24, said boss penetrating the orifice 46' in the hub 35.

The spring 16 is disposed in the groove 26 with the rear terminal 44 thereof engaged within the depression 43 while the forward terminal 42 engages the indentation 41. As viewed in Figure 1, the spring urges the actuating element 15 in a counter-clockwise direction. The actuating element 15 is prevented from rotating too far in a counter-clockwise direction by the detent 50 which contacts the body 12. The actuating element 15 is prevented from moving forwardly thereof off the boss 24 by the first locking member 17, the threaded shank 45 of which engages the internally threaded bore 25. The rear surface of the head 46 serves as a bearing surface.

The outer end of the scraper member 21 is provided with a boss 51 which is pivotally mounted in an opening 52 in the upper portion of the scoop element 11. The bearing 29 is larger than the distance between the opposed edges 53 and 54 in the support portion 20 within which it is rotatably mounted so that the bearing 29 is prevented from moving forwardly out of the notch in the portion 20 within which it is disposed. The inner portion of said notch is widened to accommodate the bearing 29. The pinion 30 is fixed upon the axle 18, said pinion meshing with the teeth on the rack 39. The axle pin 31 is seated within the cavity 34 of the locking member 19.

The projections 47 and 48 are disposed laterally on opposed sides of the second locking member or axle 18. Sufficient clearance is provided between the rearmost surface of the axle 18 and the forward surfaces 55 of the first locking member 17 so that undesirable binding at this point does not occur.

The second locking member, therefore, acts to prevent undesired rotation of the first locking member 17 so that the first locking member cannot be accidentally disconnected from the bore 25.

By this construction it may be seen that no amount of rotation of the actuating element 15 will result in disconnection of the first locking member 17 from the body 12.

When it is desired to replace the spring 15, because it has lost its resiliency or because it has broken, or when it is desired to disassemble the device, it becomes necessary only to unscrew the third locking member 19 whereupon the boss 51 may be unseated by pressing it down as viewed in Figure 1 until it snaps within the scoop element 11. Following this the bearing 29 may be moved into the scoop element 11 so that the axle 18 may be moved forwardly between the edges 53 and 54. When the knife or scraper element 14 is removed the locking member 17 may be unscrewed and the spring 15 replaced. Reassembly requires a mere reversal of the steps described.

Turning now to the alternate form of first locking member shown in Figure 6, for the purpose of avoiding needless repetition, parts corresponding to those of the first embodiment are given the same reference characters with the addition of the prefix "1." In this form it will be seen that there is an additional groove 255 and there are a greater number of projections 147, 148, 247 and 248. By the use of the alternate form of the first locking member, a somewhat finer seated thread adjustment can be obtained and additional wearing surfaces are provided. Depending of course upon the total diameter of the head 146, a greater number of aligned pairs of grooves bordered by correspondingly positioned projections may be utilized.

During normal operation the handle 40 on Figure 1 is moved in a clockwise direction which causes the scraper element 14 to rotate in a counter-clockwise direction as viewed from above said figure. This may or may not cause the first locking member to rotate in a clockwise direction. Such clockwise rotation of the first blocking member will be stopped as soon as the projections 47 or 48 engage the second locking member or axle 18. It may thus be seen that by our novel locking construction the disconnection of the actuating element 15 is positively prevented and the portion 55 in the central rear area of the body 12 is smooth, having no projecting parts such as screw ends or cotter pins to have food collect in the crevices thereof to substantially decay, nor can such cotter pins or nuts accidentally drop into the food being dispensed.

We wish it to be understood that we do not desire to be limited to the exact details of construction shown and described for obvious modifications will occur to a person skilled in the art.

We claim:

1. A disher device comprising: a scoop element; a body element attached to said scoop element; a scraper element including a scraper member disposed in said scoop and an axle rotatably mounted on said body; an actuating element pivotally mounted on said body and engaging said scraper element whereby motion of the actuating element imparts motion to said axle, the pivotal axis of the actuating element being disposed at an angle with respect to the rotational axis of the axle; and locking means preventing said actuating element from moving away from said body; said locking means having axial movement thereof restricted by engaging said body by a rotational movement; said locking means having an eccentrically disposed projection whose path of travel is orbital with respect to the axis of the locking means when the locking means is rotated and which projection is laterally intercepted by said axle thereby inhibiting rotational movement of the locking means.

2. A disher device comprising: a scoop element; a body element attached to said scoop element; a scraper element including a scraper member disposed in said scoop and an axle rotatably mounted on said body; an actuating element pivotally mounted on said body and engaging said scraper element whereby motion of the actuating element imparts motion to said axle, the pivotal axis of the actuating element being disposed at an angle with respect to the rotational axis of the axle; and locking means preventing said actuating element from moving away from said body, said locking means threadedly engaging said body by a rotational movement; said locking means having an eccentrically disposed projection whose path of travel is orbital with respect to the axis of the locking means when the locking means is rotated and which projection is laterally intercepted by said axle thereby inhibiting rotational movement of the locking means.

3. A disher device comprising: a scoop element; a body element attached to said scoop element; a scraper element including a scraper member disposed in said scoop and an axle rotatably mounted on said body; an actuating element pivotally mounted on said body and engaging said scraper element whereby motion of the actuating element imparts motion to said axle, the pivotal axis of the actuating element being disposed at an angle with respect to the rotational axis of the axle; and locking means preventing said actuating element from moving away from said body, said locking means including a locking member having a head, a threaded shank and an eccentrically disposed projection outwardly of said head, said threaded shank being in threaded engagement with said body, said projection when the locking member is rotated having an orbital path of travel with respect to the axis of the threaded shank, said projection being thereupon laterally blocked by said axle.

4. A disher device comprising: a scoop element; a body element attached to said scoop element; a scraper element including a scraper member disposed in said scoop and an axle rotatably mounted on said body; an actuating element pivotally mounted on said body and engaging said scraper element whereby motion of the actuating element imparts motion to said axle, the pivotal axis of the actuating element being disposed at an angle with respect to the rotational axis of the axle; and locking means preventing said actuating element from moving away from said body, said locking means including a locking member having a head, a threaded shank, and a pair of projections outwardly of said head; said threaded shank being in threaded engagement with said body, said axle lying between said projections and preventing rotation of said locking member.

5. A disher device comprising: a scoop element; a body element attached to said scoop element; a scraper element including a scraper member disposed in said scoop and an axle rotatably mounted on said body; an actuating element pivotally mounted on said body and engaging said scraper element whereby motion of the actuating element imparts motion to said axle, the pivotal axis of the actuating element being disposed at an angle with respect to the rotational axis of the axle; and locking means preventing said actuating element from moving away from said body, said locking means including a locking member having a head, a threaded shank, and a plurality of projections circumferentially arranged about and outwardly of said head; said threaded shank being in threaded engagement with said body; said projections being spaced and providing a path between any two side by side projections for said axle which path intersects the axis of the locking means.

ANTHONY GORDON.
STEFAN GEORGE MOZOLEWSKI.

REFERENCES CITED

The following references are of record in the file of this patent:

UNITED STATES PATENTS

| Number | Name | Date |
|---|---|---|
| 2,155,700 | Donahue | Apr. 25, 1939 |